United States Patent
Dingmann

(10) Patent No.: US 12,130,262 B2
(45) Date of Patent: Oct. 29, 2024

(54) CHANGE DETECTION IN MATERIAL TESTING

(71) Applicant: TA Instruments-Waters LLC, New Castle, DE (US)

(72) Inventor: David L. Dingmann, Saint Paul, MN (US)

(73) Assignee: TA Instruments-Waters LLC, New Castle, DE (US)

( * ) Notice: Subject to any disclaimer, the term of this patent is extended or adjusted under 35 U.S.C. 154(b) by 379 days.

(21) Appl. No.: 17/557,153

(22) Filed: Dec. 21, 2021

(65) Prior Publication Data

US 2022/0221383 A1 Jul. 14, 2022

Related U.S. Application Data

(60) Provisional application No. 63/136,361, filed on Jan. 12, 2021.

(51) Int. Cl.
*G01N 3/02* (2006.01)
(52) U.S. Cl.
CPC ..................... *G01N 3/02* (2013.01)
(58) Field of Classification Search
None
See application file for complete search history.

(56) References Cited

U.S. PATENT DOCUMENTS

| | | | | |
|---|---|---|---|---|
| 3,248,924 A | * | 5/1966 | Boynton | G01N 3/32 102/314 |
| 2005/0120802 A1 | * | 6/2005 | Schulz | G01N 3/08 73/781 |
| 2015/0377754 A1 | * | 12/2015 | Kanade | G01N 3/02 73/788 |
| 2021/0247281 A1 | * | 8/2021 | Tremblay | G01N 3/08 |

FOREIGN PATENT DOCUMENTS

CN 112179691 A * 1/2021 .......... G01M 99/004

OTHER PUBLICATIONS

Elif Ecem Bas, Denis Aslangil, Mohamed Aly Moustafa; Predicting Nonlinear Seismic Response of Structural Braces Using Machine Learning (Year: 2020).*

(Continued)

*Primary Examiner* — Jermele M Hollington
*Assistant Examiner* — Carl F. R. Tchatchouang
(74) *Attorney, Agent, or Firm* — Schmeiser, Olsen & Watts LLP; Victor J. Baranowski

(57) ABSTRACT

Disclosed is a material testing system that includes a fixture, a frame, a load sensor, a displacement sensor and a computer system coupled to the material testing system. The computer system includes one or more processors, one or more memory devices coupled to the one or more processors, one or more computer readable storage devices coupled to the one or more processors, wherein the one or more storage devices contain program code executable by the one or more processors via the one or more memory devices to implement a method for detecting a change in a material testing sequence. A computer program product that implements a method for detecting a change in a material test sequence, and methods for detecting a change in a material test sequence or fatigue test is further disclosed.

20 Claims, 11 Drawing Sheets

(56) References Cited

OTHER PUBLICATIONS

International Preliminary Report on Patentability in PCT/US2021/064497, mailed on Jul. 27, 2023.
International Search Report and Written Opinion in PCT/US2021/064497 mailed on May 9, 2022.
Elif Ecem Bas, et al. "Predicting Nonlinear Seismic Response of Structural Braces using Machine Learning," ARXIV.org, Cornell University Library, Jul. 27, 2020.
Shi Peng, et al. "Using Long Short Term Memory Based Approaches for Carob Steel Fatigue Remaining Useful Life Prediction," 2018 Prognostics and System Health Management Conference, pp. 1055-1060.

\* cited by examiner

FIG. 6A
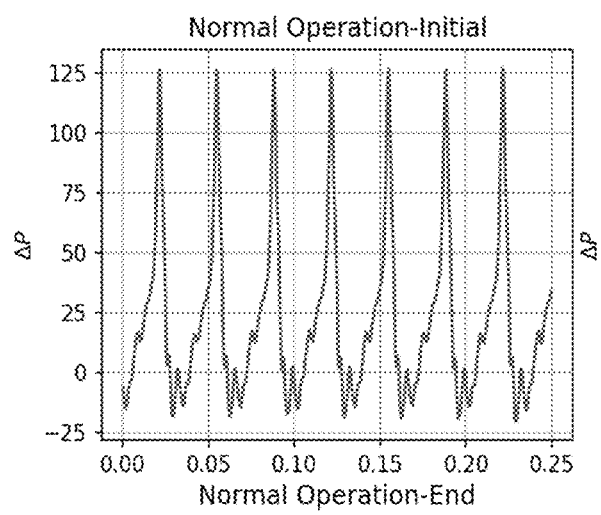
FIG. 6B
FIG. 6C
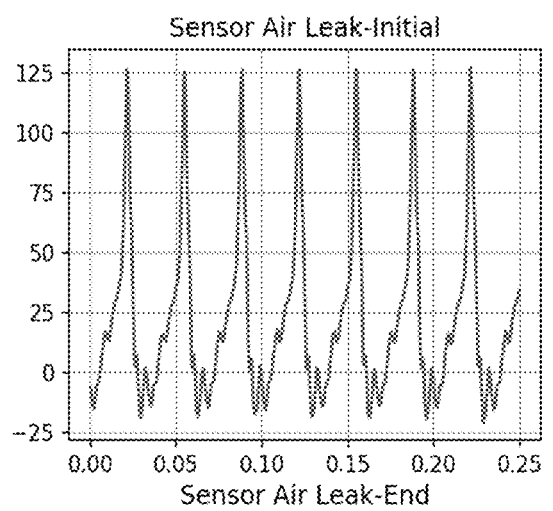
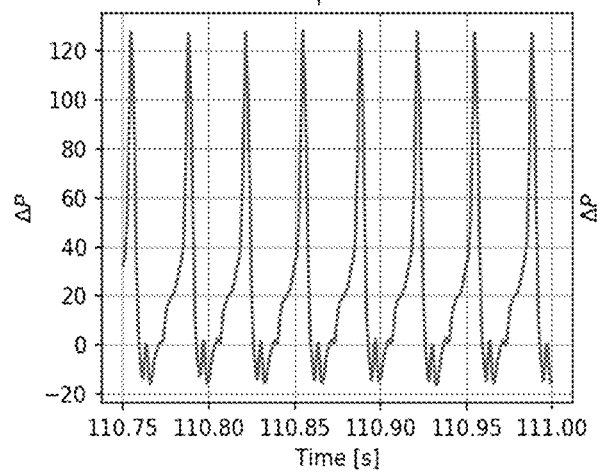
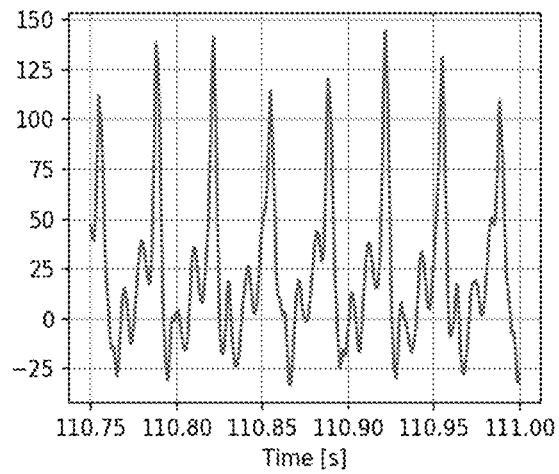
FIG. 6D

FIG. 8A
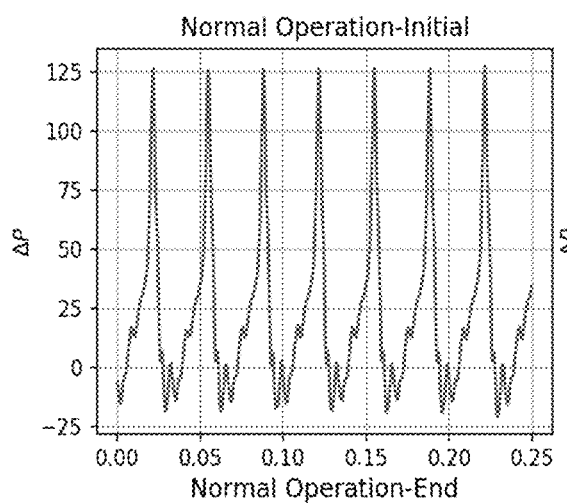
FIG. 8B
FIG. 8C
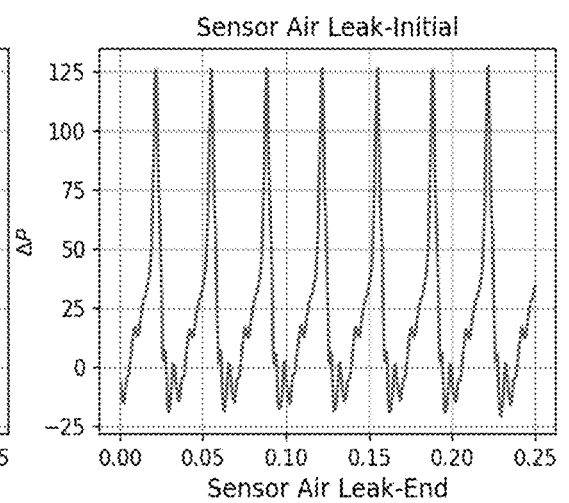
FIG. 8D
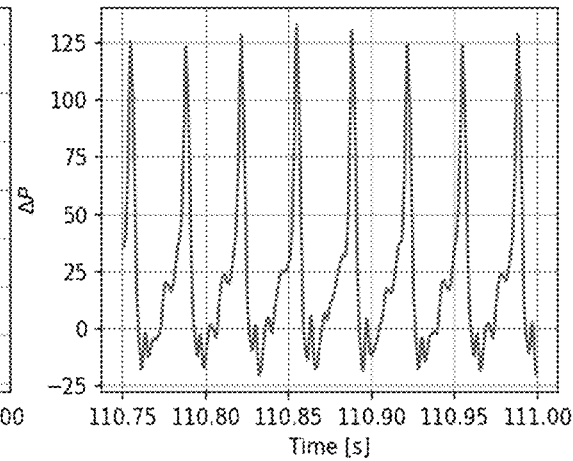

CHANGE DETECTION IN MATERIAL TESTING

RELATED APPLICATION

This application claims the benefit of the earlier filing date of U.S. Provisional Patent Application Ser. No. 63/136,361 filed Jan. 12, 2021 and titled "Change Detection in Material Testing," the entirety of which is incorporated herein by reference.

FIELD OF THE INVENTION

The invention relates generally to material testing and material test systems. More particularly, the invention relates to change detection using neural networks and machine learning for material testing such as fatigue testing, and associated systems and methods.

BACKGROUND

In material testing systems, cyclic fatigue tests often run for long periods of time, producing a substantial amount of data. Many of these tests will run for many cycles where the data remains very similar until an event occurs. For example, an event may be that a crack begins to form in the sample being tested. After such an event, the characteristics of the data will change. This change may be abrupt or may be gradual. In addition to events related to the test specimen, issues with the test system itself can arise during the test, which also might introduce anomalies into the test data.

Detecting these events, and the changes associated with these events, typically requires a user to monitor the data regularly to scan for changes in the data. Alternatively, a pre-configuration limit may be set on a known parameter which automatically raises an alert when met. These options can be time consuming and may require foreknowledge of the type of failure indicator that is expected. These options further require a failure mode to progress to an obvious level before it can be detected.

Therefore, systems and methods which accurately and quickly detect these changes occurring during material testing would be well received in the art.

SUMMARY

In one embodiment, a material testing system comprises: a fixture; a frame; a load sensor; a displacement sensor; and a computer system coupled to the material testing system, the computer system comprising: one or more processors; one or more memory devices coupled to the one or more processors; one or more computer readable storage devices coupled to the one or more processors, wherein the one or more storage devices contain program code executable by the one or more processors via the one or more memory devices to implement a method for detecting a change in a material testing sequence, the method comprising: receiving, by the computer system, actual test data during a material testing sequence of a material under test by the material testing system; training, by the computer system, a model based on the actual test data received; receiving, by the computer system after the training, additional test data in real time during the material testing sequence; and detecting, by the computer system, a change in the material testing sequence based on the model and the additional test data.

Additionally or alternatively, the model is a long short-term memory (LSTM) model.

Additionally or alternatively, the method further comprises notifying, by the computer system, an operator of the detected change by sending a notification to a device of the operator over a network.

Additionally or alternatively, the method further comprises: modifying, by the computer system, the parameters of the material testing sequence of the material testing system in response to the detected change.

Additionally or alternatively, the method further comprises: shifting, by the computer system, the model from a training mode to a prediction mode after the training is completed.

Additionally or alternatively, the change in the material testing sequence corresponds to a physical change in the material under test.

Additionally or alternatively, the training includes accounting for changes in a testing environment over time.

Additionally or alternatively, the method further comprises: adjusting, by the computer system, a tolerance of the model based on user input, the tolerance providing a threshold over which the computer system will flag the change.

Additionally or alternatively, the model is a cognitive neural network (CNN) model, and the method further comprises: using, by the computer system, test data from the material testing sequence of the material under test on a second material testing sequence of a second material under test conducted at a later time than the material testing sequence; and predicting, by the computer system, a cause of failure using the CNN model.

In another embodiment, a method for detecting a change in a material testing sequence comprises: receiving, by one or more processors of a computer system operable connected to a material testing system, actual test data during a material testing sequence of a material under test by the material testing system; training, by the computer system, a model based on the actual test data received; receiving, by the computer system after the training, additional test data in real time during the material testing sequence; and detecting, by the computer system, a change in the material testing sequence based on the model and the additional test data.

Additionally or alternatively, the model is a long short-term memory (LSTM) model.

Additionally or alternatively, the method further comprises: notifying, by the computer system, an operator of the detected change by sending a notification to a device of the operator over a network.

Additionally or alternatively, the method further comprises: modifying, by the computer system, the parameters of the material testing sequence of the material testing system in response to the detected change.

Additionally or alternatively, the method further comprises: shifting, by the computer system, the model from a training mode to a prediction mode after the training is completed.

Additionally or alternatively, the change in the material testing sequence corresponds to a physical change in the material under test.

Additionally or alternatively, the training includes accounting for changes in a testing environment over time.

Additionally or alternatively, the method further comprises: adjusting, by the computer system, a tolerance of the model based on user input, the tolerance providing a threshold over which the computer system will flag the change.

Additionally or alternatively, the model is a cognitive neural network (CNN) model and the method further comprises: using, by the computer system, test data from the material testing sequence of the material under test on a second material testing sequence of a second material under test conducted at a later time than the material testing sequence.

In another embodiment, a computer program product, comprising a computer readable hardware storage device storing a computer readable program code, the computer readable program code comprising an algorithm that when executed by a computer processor of a computing system, implements a method for detecting a change in a material testing sequence, the method comprising: receiving, by the one or more processors of the computer system, actual test data during a material testing sequence of a material under test by the material testing system; training, by the computer system, a model based on the actual test data received; receiving, by the computer system after the training, additional test data in real time during the material testing sequence; and detecting, by the computer system, a change in the material testing sequence based on the model and the additional test data.

In another embodiment, a method for detecting a change in fatigue testing comprises: initiating a fatigue test by a material testing system; collecting test data by a computer system during a training stage of the fatigue test; training a model using machine learning based on the collected test data; continuing the fatigue test after the model is trained and continuing to receive additional test data during the fatigue test; and using the model to detect an anomaly in the fatigue test.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

FIG. 6A depicts a graphical representation of data obtained during the beginning of a training mode of a first fatigue test, in accordance with embodiments of the present invention.

FIG. 6B depicts a graphical representation of data obtained at the end of the training mode of the first fatigue test of FIG. 6A, in accordance with embodiments of the present invention.

FIG. 6C depicts a graphical representation of data obtained at the beginning of a prediction mode of the first fatigue test of FIGS. 6A-6B, in accordance with embodiments of the present invention.

FIG. 6D depicts a graphical representation of data obtained at the end of the prediction mode of the first fatigue test of FIGS. 6C-6D, in accordance with embodiments of the present invention.

FIG. 8A depicts a graphical representation of data obtained during the beginning of a training mode of a second fatigue test, in accordance with embodiments of the present invention.

FIG. 8B depicts a graphical representation of data obtained at the end of the training mode of the second fatigue test of FIG. 6A, in accordance with embodiments of the present invention.

FIG. 8C depicts a graphical representation of data obtained at the beginning of a prediction mode of the second fatigue test of FIGS. 6A-6B, in accordance with embodiments of the present invention.

FIG. 8D depicts a graphical representation of data obtained at the end of the prediction mode of the second fatigue test of FIGS. 6C-6D, in accordance with embodiments of the present invention.

DETAILED DESCRIPTION

Figure 1:
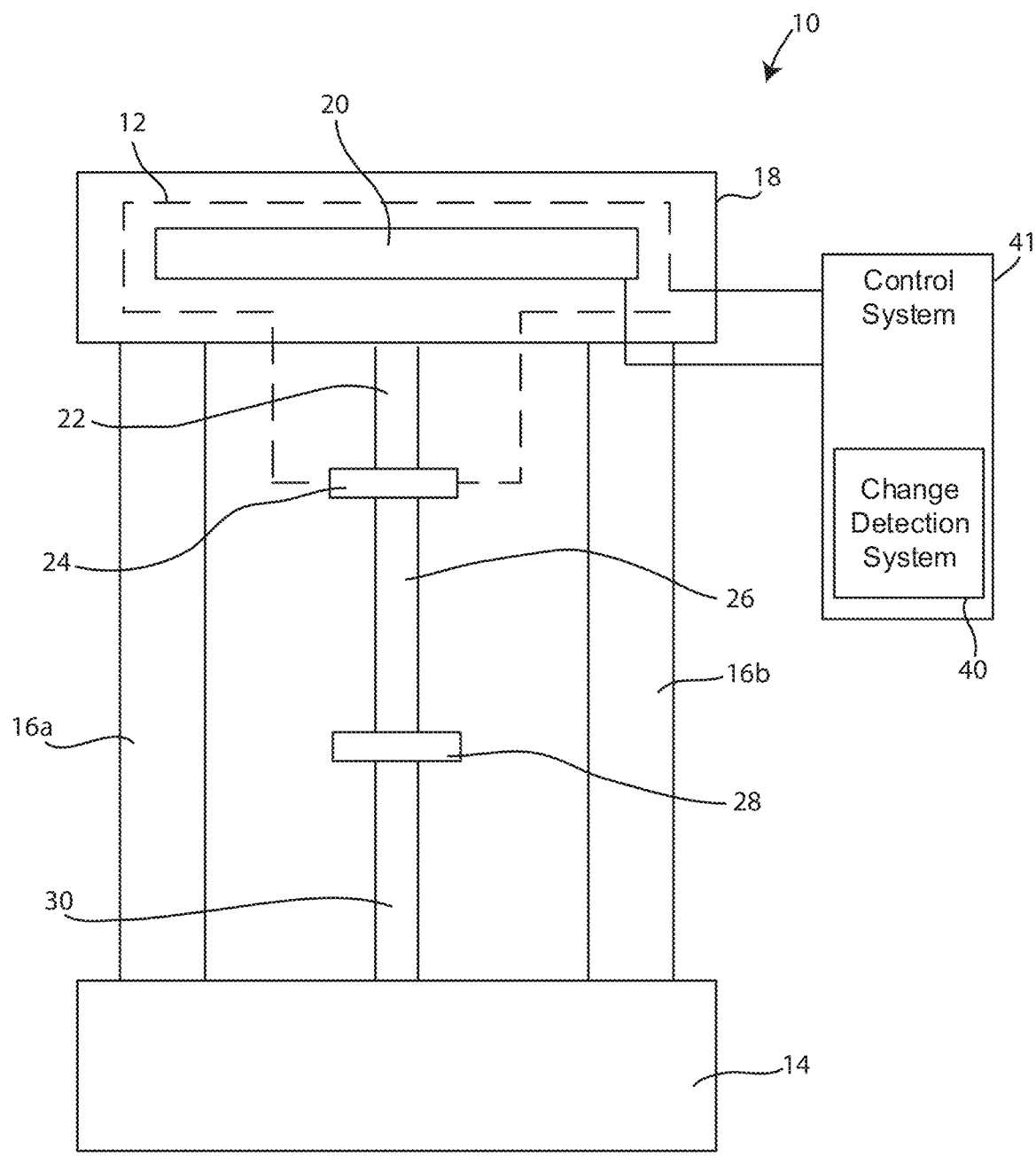
FIG. 1 depicts a schematic view of a material testing system having a change detection system, in accordance with embodiments of the present invention.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

In brief overview, the invention relates to material testing systems that utilize neural networks and machine learning to predict and/or detect changes in a test sequence. These material testing sequences may be cyclical, for example. Example of cyclical test sequences include fatigue tests during which a sample is exacted upon by a material testing system in a repeated manner. Changes might occur during the material testing that might produce anomalies in test data. The present invention provides methods and systems that use machine learning and neural networks for detecting these changes more quickly and accurately than prior material testing systems.

Whether a change in test data comes from a change in the sample itself or in an abnormal operation of a material testing system, the present invention provides automated and sensitive methods and systems for detecting these changes. The present invention particularly contemplates time-series forecasting, such as by using long short-term memory (LSTM) machine learning modeling. LSTM models contemplated herein are capable of updating its state (and thereby its output) based on both the current input and previous input(s). As contemplated herein, neural networks such as LSTM models are trained on the characteristics of the initial test data received. The data received can be separated into single data points, individual cycles, or groups of cycles, with the model being trained to produce the subsequent data or cycle(s) based on the previous data or cycles. Thus, the neural networks contemplated are trained on good data that contains normal cycle variations. Because the neural networks are trained on real data occurring during a training phase of a test sequence, the LSTM models contemplated herein do not presume "ideal" data that is free of noise or other normal permutations. Rather, the LSTM models contemplated herein account for normal variation by considering such variations in the data received during a training phase. While LSTM models are particularly contemplated, other neural networks are contemplated such as cognitive neural networks (CNNs), or the like.

Once a training phase is completed, embodiments of the invention contemplated herein can monitor the test sequence based on the neural network model generated prior. If the material testing system and sample continue to operate normally, the output should be similar to the cycles learned by the model during the training phase. These actual testing cycles can be compared with the model cycles. While there may be some level of difference between them (i.e. the prediction may not be perfect), as long as the actual testing cycles are within a predefined tolerance, the test can be considered to be operating as normal by the change detection system. However, should the data begin to deviate from the value predicted by the trained model, the change detection systems contemplated herein may be configured to flag the change, notify an operator to prompt the operator to inspect the system, or actually make changes to the test sequence (such as stopping the test sequence early).

The present invention contemplates using neural networks and machine learning to predict and/or detect changes to a test sequence to any type of material testing system. A "material testing system" as described herein include any type of system for performing material testing by applying force to any test specimen or sample. Material testing systems may be load frames using electro-magnetic linear motors. Examples of such devices include the Electro-Force™ series of test instruments from TA Instruments™. Material testing systems may include multi-specimen fatigue testing systems, cardiovascular test instruments, and/or tissue engineering instruments. Both vertical axis actuator systems and horizontal axis actuator systems are also contemplated. Still further, rheological instruments which apply stress or strain on a deformable material, such as rheometers, are contemplated. Material testing systems may be configured to perform cyclical fatigue tests, or other types of tests, such as "pull to failure" tests.

FIG. 1 depicts a schematic view of an exemplary material testing system 10 having a change detection system 40, in accordance with embodiments of the present invention. The material testing system includes a base 14 from which two frame posts 16a, 16b extend. The posts 16a, 16b extend to a linear motor housing unit 18 within which a linear motor 20 resides. Extending downward from the linear motor 20 and the housing unit 18 is a vertically aligned output shaft 22. The output shaft 22 extends to an upper clamp mechanism 24 that is configured to interface, hold or otherwise clamp a test specimen 26, which represents any sample testable by the material testing system 10. The test specimen 26 is held between the upper clamp mechanism 24 and a lower clamp mechanism 28 which extends from a lower shaft 30 that is attached to the base 14 and extends upward therefrom.

The material testing system 10 is shown to be a single motor system in which a single axis, i.e. the vertical output shaft 22, is configured to move vertically during a testing sequence. However, other embodiments of vertically aligned material test systems are contemplated in which the change detection systems described herein may be applicable. For example, a vertically aligned material test system may include two linear motors: one to move the vertical output shaft 22 and the other to move a vertical output shaft extending from below to the lower clamp 28.

Force sensors may be located within the base 14 and/or mounted above the base 14 in order to detect forces transferred to the lower shaft 30 through the application of force on the test specimen 26 by the movement of the output shaft 22 and the resulting force transfer to the lower clamp 28. Additionally, force sensors and/or a displacement sensor may be mounted within the unit 18 configured to detect force on, and/or displacement of, the output shaft 22. The material testing system 10 may include various sensors in order to test the physical properties of test specimens, such as the test specimen 26.

The change detection system 40 may be incorporated into a control system 41 of the material testing system 10 which may be connectable to various electronically controlled features 12 the material testing system 10. The change detection system 40 and/or the control system 41 may be connected to the linear motor 20 unit and the sensor system of the material testing system 10 via a wired or wireless connection. The change detection system 40 may include the various features described hereinbelow related to systems and methods for detecting changes or anomalies within a material test. The change detection system 40 and/or control system 41 may include one or more external computing devices running control software configured to monitor the material testing system 10. The control system 41 may be configured to control the various features of the material testing system 10. The software of the control and/or change detection systems 40, 41 may be used by an operator to view and interpret the information gathered by the material testing system 10 during a testing sequence. Further, the software of the control and/or change detection systems 40, 41 may be used by the operator to program or control the material testing system 10 prior to and/or during a testing sequence.

The material testing system 10 may represent any material testing system or load frame for testing materials. For example, the material testing system 10 may be a floor standing instrument or an instrument that is placed on a workbench or table. The material testing system 10 may represent systems having any output shaft range of motion, force range, frequency range or the like. The material testing system 10 may be capable of attaching test chamber instruments within which the shafts 22, 30 and clamps 24, 28 extend and within which the test specimen is housed in particular environmental conditions during testing. The material testing system 10 may include adjustability features or any features known in the art. Further, the linear motor 20 may be replaced by a rotational or torsion motor. In two motor systems whereby the base 14 houses a motor, both motors may be linear motors, or one motor may be a torsion motion for applying rotation on an output shaft, and thereby applying rotation to the test specimen via a rotating clamp. Any testing configuration is possible.

The material testing system 10 may further represent an instrument configured to test biological material by providing a testing chamber that simulates in vivo conditions. Furthermore, the material testing system 10 is shown with a single output shaft and single motor. In other embodiments, multiple output shafts and/or motors may be used with corresponding lower shaft and clamps for testing multiple test specimens simultaneously.

Figure 2:
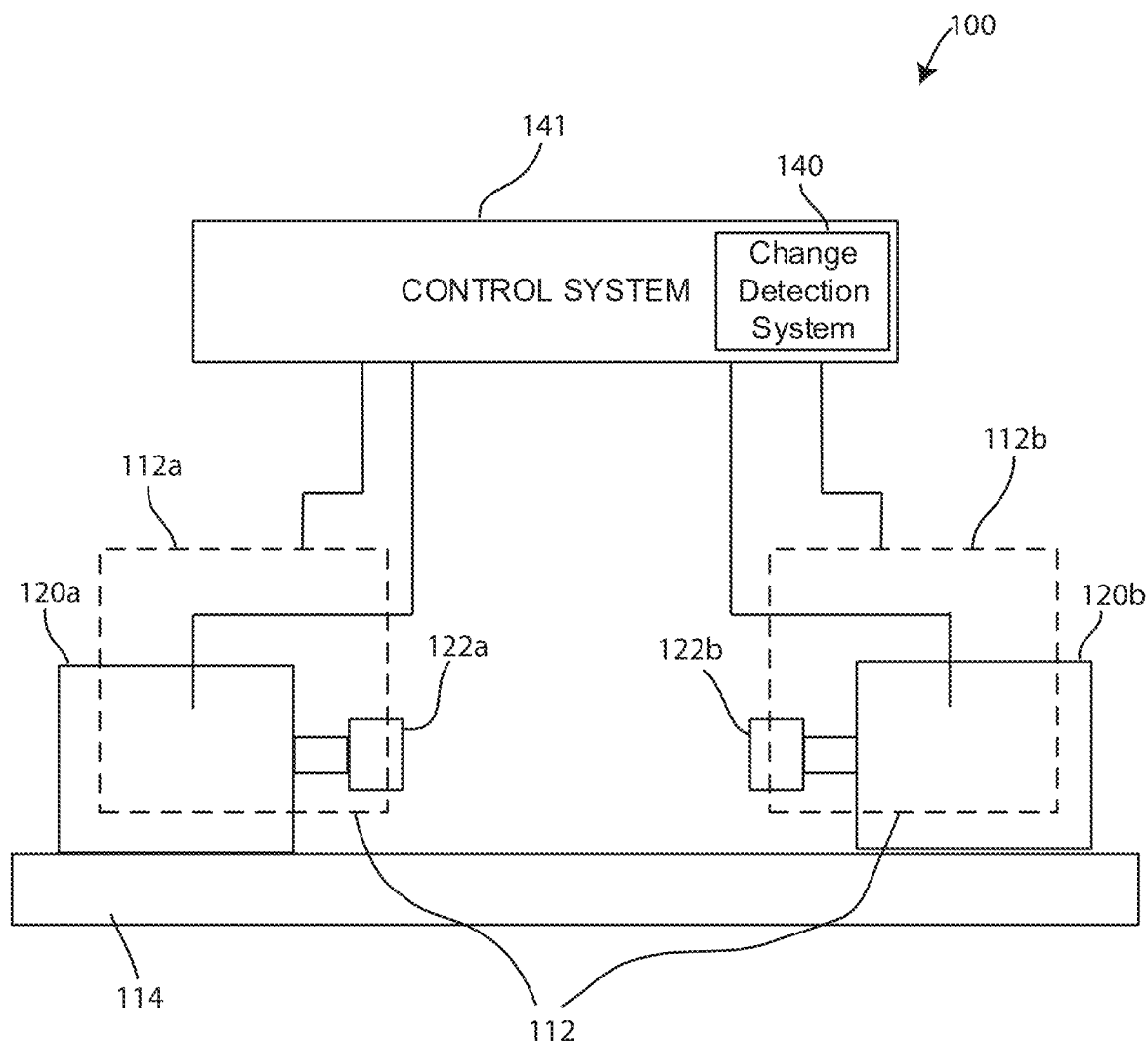
FIG. 2 depicts a schematic view of another material testing system having a change detection system, in accordance with embodiments of the present invention.

FIG. 2 depicts a schematic view of another material testing system 100 having a change detection system 140, in accordance with embodiments of the present invention. The material testing system 100 may be a horizontal testing system, rather than a vertical testing system like the material testing systems 10 described hereinabove. The material testing system 100 includes a first motor 120a and a second motor 120b each located on a table or bench 114. The motors 120a, 120b, may be adjustably moved or relocated along the bench 114 in order to accommodate different tests. The two motors 120a, 120b may each be the same type of linear motor in the embodiment shown. In other embodiments, the motors 120a, 120b may be different. For example, one motor may be a linear motor while the other motor may be a torsion motor capable of applying rotation on the clamp and thereby rotating an attached test specimen. In still other embodiments, only a single motor may be necessary. In these embodiments, one of the motors 120a, 120b may be replaced by a stationary base that mounts to a stationary shaft.

As shown, the change detection system 140 may be incorporated into a control system 141 of the material testing system 100. The change detection systems 140 and/or the control system 141 may be connected to the electronically controlled features 112a, 112b of the material testing system 100. The change detection system 140 of the material testing system 100 may include the various features described herein related to systems and methods for detecting changes or anomalies within a material test. Further the control system 141 may be configured to generally control operation of the material testing system 100.

Figure 3:
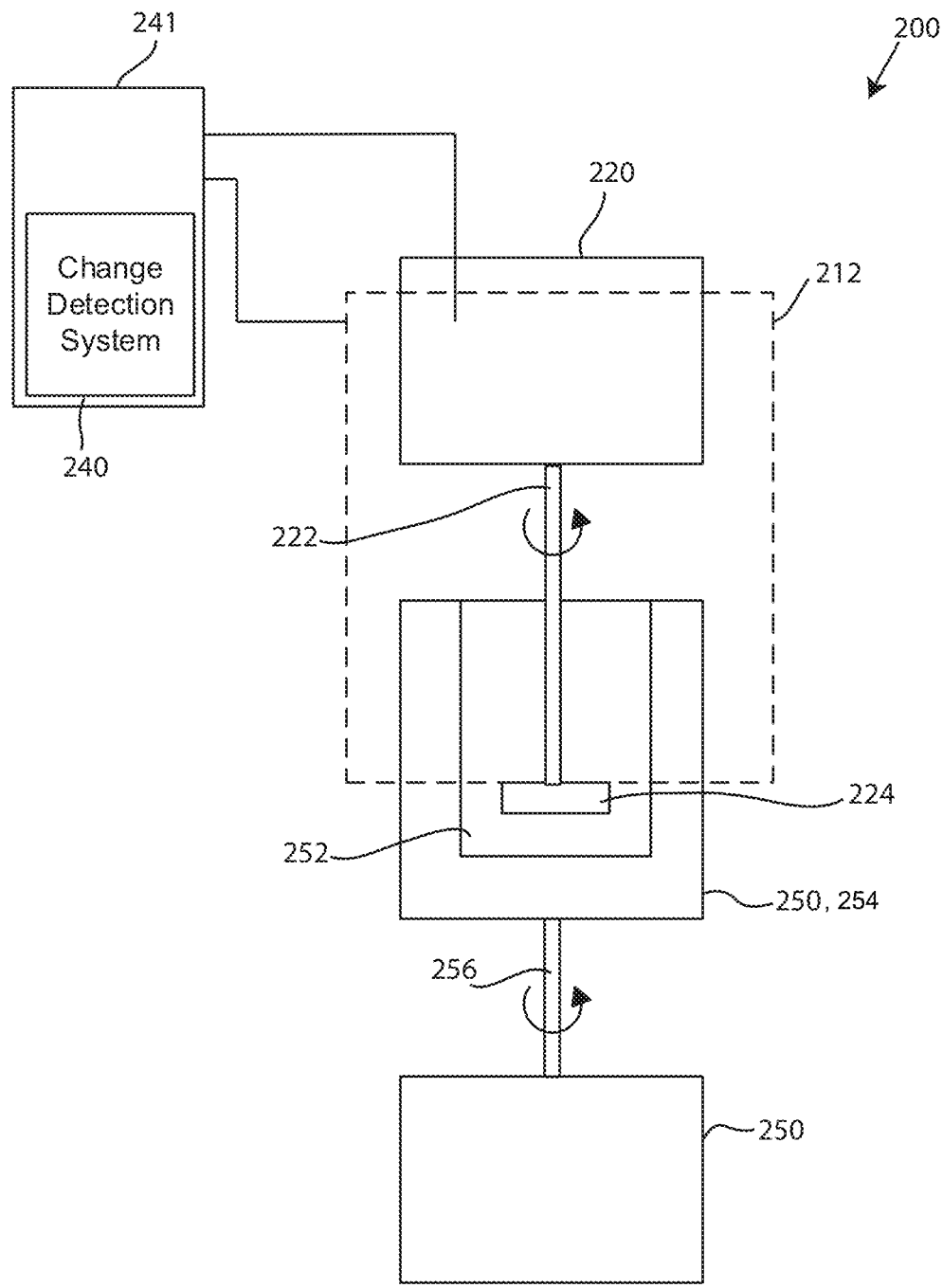
FIG. 3 depicts a schematic view of a rheometer having a change detection system, in accordance with embodiments of the present invention.

FIG. 3 depicts a schematic view of a rheometer 200 having a change detection system 240, in accordance with embodiments of the present invention. The rheometer 200 may include a drive motor driving an output 256, and transducer(s) 220 having an output shaft 222. The transducer(s) 220 may include one or both of a torque rebalance transducer and a normal force rebalance transducer. A surrounding body 250 of a sample chamber 252 is shown attached to the output 256 of the drive motor 254, while a rotor 224 located within the sample chamber 252 is shown attached to the output 222 of the transducer(s) 220. As shown, the change detection system 240 may be incorporated into a control system 241 of the rheometer 200. The change detection and/or control systems 240, 241 are shown operably connected to the various electronically controlled features 212 of the rheometer 200, including for example the drive motor 254, the transducer(s) 220, and the various sensors therein. The control system 241 may be configured to generally control operation of the rheometer 200.

The drive motor 254 may be configured to deliver accurate rotational motion of the output 256 over a broad range of angular displacement and velocity. The drive motor 254 may, for example, include an air bearing system, a high-torque friction-free brushless DC motor, an optical encoder and a temperature sensing system. The drive motor 254 and the features thereof, may be controlled by the change detection and/or control systems 240, 241 based on operator input.

The transducer(s) 220 may include a torque rebalance transducer that may be configured to measure accurate sample stress based on the torque required on the output 222 to maintain a null position. The torque rebalance transducer may include an air bearing, a high-resolution capacitive angle sensor, and a temperature sensing system. Like the drive motor 254, the torque rebalance transducer, and the features thereof, may be controlled by the control and/or change detection system 240 and directed by operator input. The transducer(s) 220 may include a normal force rebalance transducer that may be configured to measure accurate normal forces on the output 222 from a sample within the sample chamber 252. The normal force rebalance transducer may utilize position feedback to maintain the shaft of the output 222 in a null position. The normal force rebalance transducer, and the features thereof, may be controlled by the change detection and/or control systems 240, 241 and directed operator input. Additionally, the normal force rebalance transducer may be equipped with a pressure sensing system for measuring pressure in the sample chamber 252.

The surrounding body 250, the sample chamber 252 and the rotor 224 may be integral components of the rheometer 200. The rheometer 200 may also include a compressed air system (not shown) for providing compressed air to the sample chamber 252. Alternatively, it is contemplated that these components are separately attachable add-on features of a pressure cell that is attachable to, and detachable from, to the outputs 222, 256. Whatever the embodiment, the surrounding body 250 defining the sample chamber 252 is attachable to the drive motor 254 and the output 256 thereof in order to rotate with the rotation of the output 256. Likewise, the rotor 224 is attachable to the output 222 of the transducers 220 and may be configured to move with movement of the output 222. The rotor 224 may be configured to rotate relative to the surrounding body 250 defining the sample chamber 252.

The change detection and/or control systems 240, 241 may be configured to control and monitor the stresses, strains, forces, velocities, and the like, on the components of the system. The change detection and/or control systems 240, 241 may be configured to provide output information related to measurements conducted during testing of materials or samples within the sample chamber 252. The change detection and/or control systems 240, 241 may be configured to control motion of the outputs 222, 256, and further control the pressure within the sample chamber 252 through control of the compressed air system (not shown).

In the above examples, the change detection systems 40, 140, 240 may be incorporated into computer systems within the various material testing systems 10, 100, 200 described hereinabove. Thus, the control systems 41, 141, 241 may be computerized control systems including one or more processors, memory, data storage, and the ability to execute the various computer applications and algorithms described herein. As displayed by FIGS. 1-3, change detection systems consistent with the principles of the invention described herein can be applied various types of known material testing system.

Figure 4:
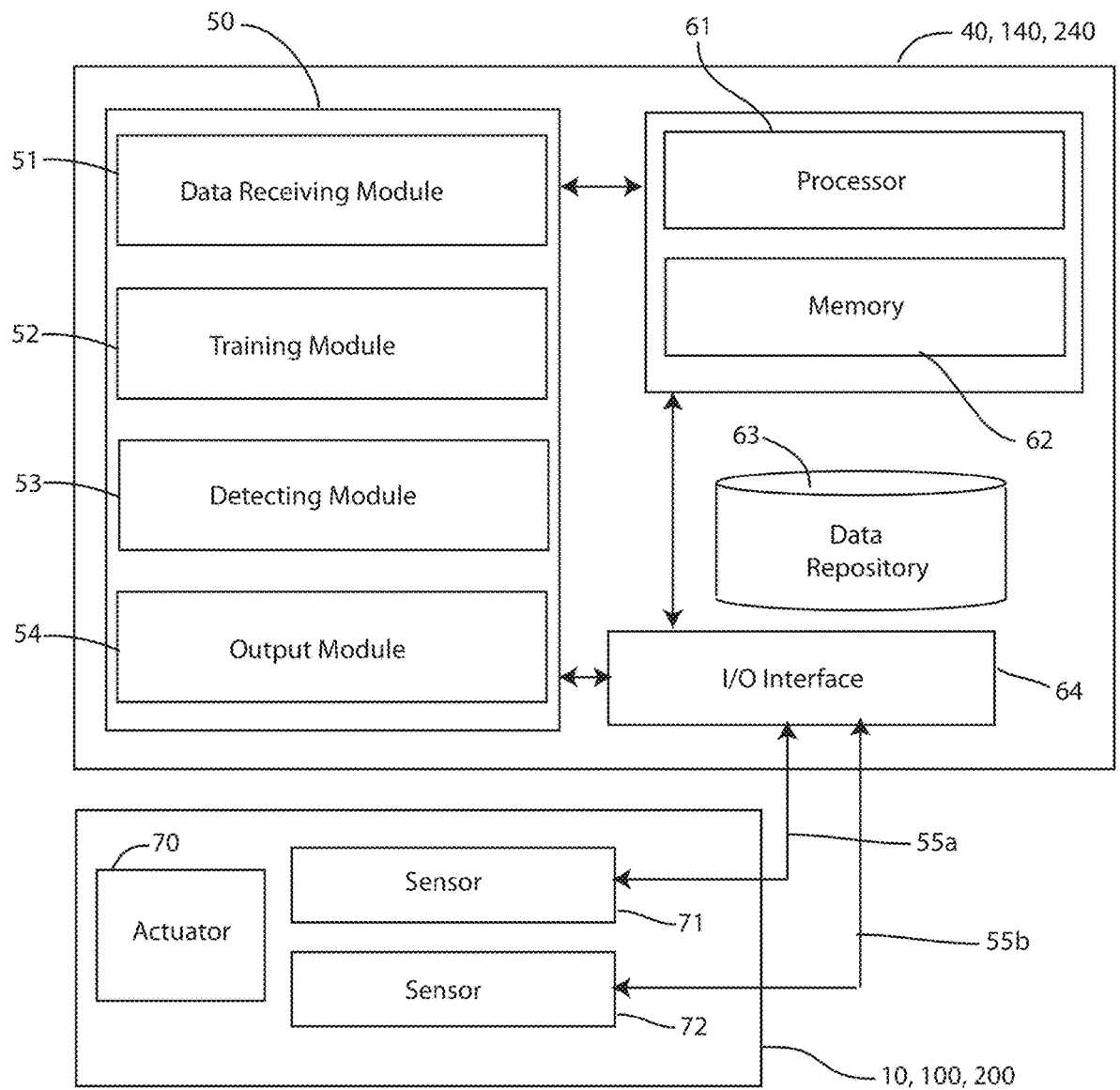
FIG. 4 depicts a block diagram of a change detection system connected to a material testing system, in accordance with embodiments of the present invention.

FIG. 4 depicts a block diagram of a change detection system 40, 140, 240 connected to a material testing system 10, 100, 200, in accordance with embodiments of the present invention. The change detection system 40, 140, 240 is schematically representative of any of the change detection systems 40, 140, 240 described hereinabove, while the material testing system 10, 100, 200 shown is exemplary of any of the respective material testing systems 10, 100, 200 described hereinabove. As shown, the change detection system 40, 140, 240 is coupled to the material testing device 10, 100, 200.

As shown, the material testing device 10, 100, 200 includes one or more actuators 70 configured to exact force on a material under test. The actuators 70 may include motors or other movement systems for creating movement or force. The material testing device 10, 100, 200 is further shown including two sensors 71, 72. The sensors 71, 72 may be displacement sensors, rotational sensors, force sensors, sensors related to the power output of the motor, or any other type of sensor configured to monitor the material testing sequence. While two sensors 71, 72 are shown, it should be understood that any number of sensors are contemplated. Whatever the embodiment, one or more of the sensors 71, 72 of the material testing device 10, 100, 200 may be communicatively coupled to the change detection system 40, 140, 240 and may be provide data thereto.

The sensors 71, 72 may be connected via an I/O interface 64 to the change detection system 40, 140, 240. The I/O interface 64 may refer to any communication process performed between the sensors 71, 72 and the environment outside of the change detection system 40, 140, 240. Input provided by the sensors 71, 72 to the change detection system 40, 140, 240 may refer to the signals or instructions sent to the change detection system 40, 140 240, for example the data signals collected by the sensors 10, 20, while output may refer to the signals sent out from the change detection system 40, 140, 240 to the material testing system 10, 100, 200, such as a signal to actuate the actuator 70 of the material testing system, 10, 100, 200. While the sensors 71, 72 are shown connecting specifically to the change detection system 40, 140, 240, it should be understood that the sensors may also be connected to the greater control systems 41, 141, 241 of the material testing systems 10, 100, 200 described herein.

Furthermore, embodiments of the change detection system 40, 140, 240 may be equipped with memory 62 which may temporarily store various data/information/code, and a processor 61 for implementing the tasks associated with the change detection system 40, 140, 240. The memory 62 and processor 61 may be the same memory and processor of the control system 41, 141, 241 of the material testing system 10, 100, 200 in some embodiments. In other embodiments, a dedicated computer system may be used for the change detection system 40, 140, 240 that is separate from the control system 41, 141, 241. Further, the change detection system 40, 140, 240 may include a data repository 63 for long term storage of data received, and models created, by the change detection system 40, 140, 240.

As shown, a change detection application 50 is loaded in the memory 62 of the change detection system 40, 140, 240. Thus, the change detection system 40, 140, 240 may further include an operating system, which can be a computer program for controlling an operation of the change detection system 40, 140, 240, wherein applications loaded onto the change detection system 40, 140, 240 may run on top of the operating system to provide various functions. Furthermore, embodiments of change detection system 40, 140, 240 may include the change detection application 50. Embodiments of the change detection application 50 may be an interface, an application, a program, a module, or a combination of modules.

While the embodiment shown contemplates that the change detection application 50 is run from a computer system housed within the material testing system 10, 100, 200, other embodiments are contemplated. For example, the change detection system 40, 140, 240 may be incorporated into a computer system that is connected to the material testing system 10, 100, 200. Alternatively, the change detection system 40, 140, 240 may be located on a device connected to the material testing system 10, 100, 200 over a network (wired or wireless). In still other embodiments, the change detection system 40, 140, 240 may be a cloud service connectable to the material testing system 10, 100, 200.

The change detection application 50 of the change detection system 40, 140, 240 may include a data receiving module 51, a training module 52, a detecting module 53, and an output module 54. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the change detection system 40, 140, 240. A module (whether hardware, software, or a combination thereof) may be designed to implement or execute one or more particular functions or routines.

Embodiments of the receiving module 51 may include one or more components of hardware and/or software program code for receiving, gathering, scraping and/or processing data related to material test sequences conducted by the material testing system 10, 100, 200. The receiving module 51 may further be configured to provide received data into the data repository 63 for permanent data storage. The receiving module 51 may be configured to associate test data with a particular time stamp and/or testing sequence for the purposes of modeling by the training module 52. Still further, the receiving module 51 may be configured to import data and split data into arrays for time, output, and the like.

The change detection system 40, 140, 240 may further include the training module 52. Embodiments of the training module 52 may include one or more components of hardware and/or software program code for training, creating or otherwise generate a machine learning model based on the testing data received by the receiving module 51. The training module 52 may be configured to create a long short-term memory (LSTM) neural network model that is capable of updating based on both the current input data, and previous input data stored in the data repository 63. The training module 52 may be configured to operate during a training stage or portion of a material testing sequence, prior to the change detection system 40, 140, 240 switching to a monitoring and/or prediction stage of a material testing sequence. The training module 52 may be configured to create a machine learning model for a predetermined amount of time (i.e. the training stage) which may be set or otherwise configurable by operator input or preference. In the event that the training module 52 trains an LSTM model, an operator may be asked to confirm that the training stage has "good data" without errors, deviations or anomalies. Alternatively, the LSTM model created by the training module 52 may be configured to automatically determine that the training stage includes good data.

While the training module 52 may be configured to create an LSTM model based on a single test sequence using an initial training stage of the single test sequence, other embodiments are contemplated whereby the training module 52 may be configured to receive and account for data across a plurality of test sequences and/or across a plurality of material testing devices. In some embodiments, the training module 52 may be configured to utilize a cognitive neural network (CNN) based on data received over many tests, along with operator input related to that data. For example, the training module 52 may create a CNN model that incorporates data across many tests in which operators provide feedback to the CNN as to the reason for anomalies, changes or deviations associated with past received data. The CNN may continue to learn from this data and operator input in order to provide a comprehensive model. This ability to train on causes of failure means the model may predict both the change and the reason for the change and communicate this to a user or operator. Such a model may require no training stage on a given test sequence, as the model may already be aware of good data from historic data received from past tests. A CNN model created by the training module 52 may be particularly effective in tests that are not cyclical, i.e. when a training stage is not possible. For example, pull to failure tests are not cyclical tests like many fatigue material tests, and may be more suited for CNN modeling.

The change detection system 40, 140, 240 may further include the detecting module 53. Embodiments of the detecting module 53 may include one or more components of hardware and/or software program code for detecting changes, anomalies, or deviations using the model created by the training module 52. The detecting module 53 may be configured to operate once the training phase is complete (if one is used) in the material testing sequence. The detecting module 53 may be configured to operate throughout the course of a material testing sequence. The detection module 53 may be configured to review, for examples, cycles of new data, and compare that data to the model generated by the training module 52. The detecting module 53 may be configured to determine when and whether data incoming in real time is changing or otherwise deviating from the learned model created by the training module 52.

The change detection system 40, 140, 240 may further include the output module 54. Embodiments of the output module 54 may include one or more components of hardware and/or software program code for providing a notification to an operator, or change an operational parameter of the material testing system 10, 100, 200, or otherwise provide an output, based on the results of the detection module 53. The output module 54 may be configured to account for a tolerance level above which a change may be considered large enough to warrant an output. Thus, the tolerance level represents a root mean squared error level (RMSE) above which the output module 54 may be configured to provide an output. While RMSE may be one example of measures for error contemplated, others could also be used, such as calculating a moving average. Any appropriate algorithm or measure could be used to track error.

The output module 54 may be configured to send a notification to a user device of an operator of the material testing sequence and/or the material testing system 10, 100, 200. For example, the output module 54 may be configured to provide a notification or alert to a mobile application for a mobile phone of an operator. The output module 54 may alternatively or additionally be configured to provide a notification to an operator interface, such as a display, of the material testing system 10, 100, 200. The output module 54 may also be configured to provide a notification to a computer, such as a desktop, laptop computer, or tablet computer, which is operably connected to the material testing system 10, 100, 200. In additional to sending a notification or alert, the output module 54 may additionally or alternatively automatically change a parameter of the material testing system 10, 100, 200, such as by ending a test early or changing a parameter during testing to account for an anomaly. Alternatively, the output module 54 may be configured to provide a prompt to a user to determine whether the user wishes to change a parameter of the material testing system 10, 100, 200 and/or of the material test sequence.

Figure 5:
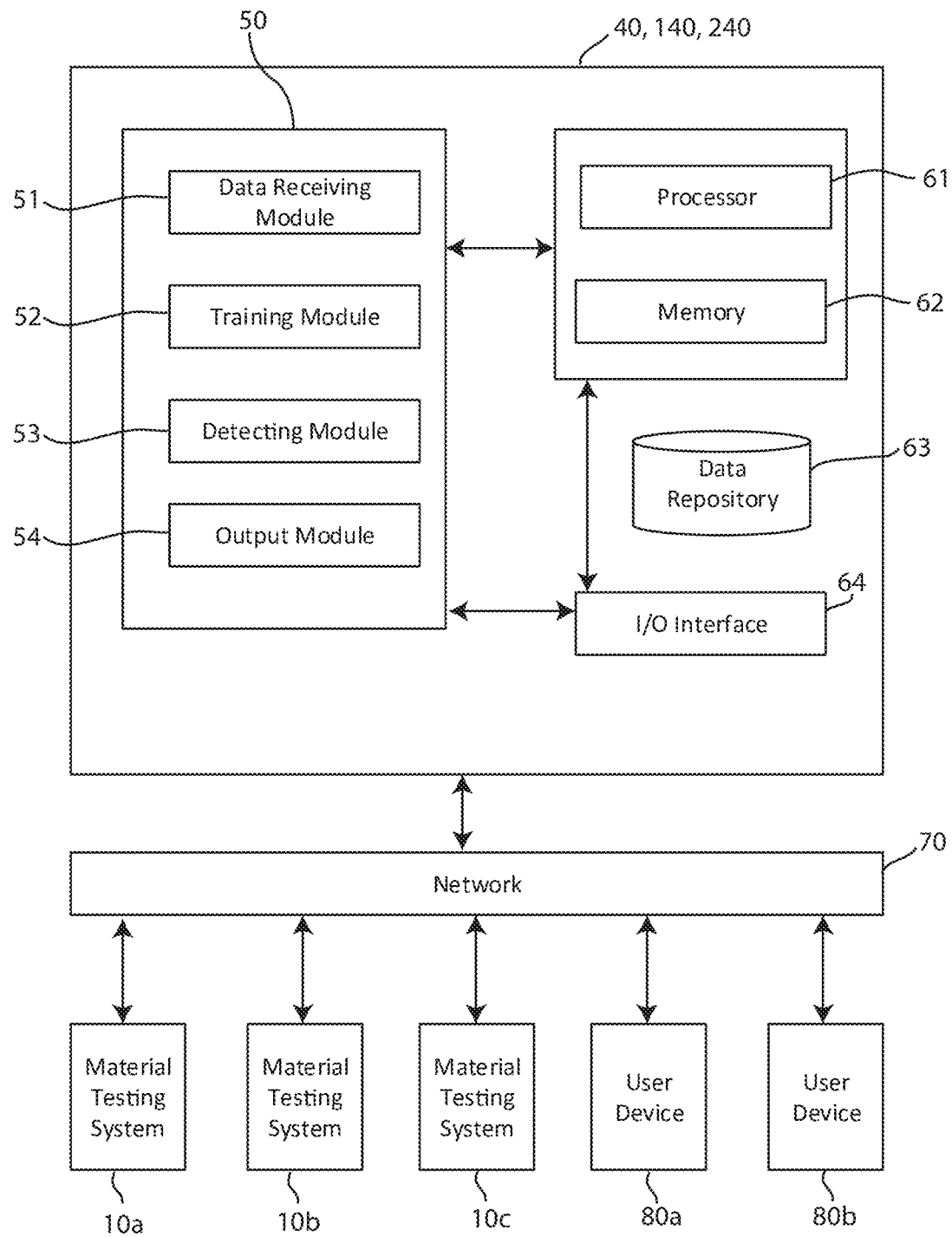
FIG. 5 depicts a block diagram of a cloud-based change detection system, in accordance with embodiments of the present invention.

FIG. 5 depicts a block diagram deploying the change detection system 40, 140, 240 as a cloud solution, in accordance with embodiments of the present invention. As shown, the change detection system 40, 140, 240 is connected over a network 70 to a plurality of material testing systems 10a, 10b, 10c, along with a plurality of user devices 80a, 80b. The network 70 may be any type of network, and may be one or more of a LAN, a WAN, a campus area network (CAN), a home area network (HAN), a metropolitan area network (MAN), an enterprise network, a cloud computing network (either physical or virtual) such as the Internet, a cellular communication network such as a GSM or CDMA network, or a mobile communications data network. The architecture of the network may be a peer-to-peer network in some embodiments. In other embodiments, the network may be organized as a client/server architecture.

The various material testing systems 10a, 10b, 10c may be the same model testing system in the embodiment shown, each configured to conduct the same or similar material test sequences and provide test data to the change detection system 40, 140, 240 over the network 70. In other embodiments, the change detection system 40, 140, 240 may be configured to detect changes as a cloud solution for a number of different material testing systems each running different material tests. The change detection system 40, 140, 240 may be provided for a single client or customer, or may be provided to simultaneously monitor and detect changes for multiple clients or customers across various connections through various material testing systems. Thus, the material testing systems connected to the change detection system 40, 140, 240 in this manner may be located in different physical locations, and may be owned and operated by different entities. In some embodiments, the change detection system 40, 140, 240 may incorporate or share data across all material testing systems connected thereto into one or more machine learning CNN models. In other embodiments, while the change detection system 40, 140, 240 may be connected to various different material testing systems operated by different customers, clients or other entities, the change detection system 40, 140, 240 may retain the separation of data and train various models that are entity-specific so that data is not shared between entities.

While the embodiment in FIG. 5 shows each of the various features and modules of the change detection system 40, 140, 240 incorporated into a separate computer system connected over the network 70 to the different material testing systems 10a, 10b, 10c, in some embodiments some of the functionality of the change detection system 40, 140, 240 described hereinabove may be incorporated into the material testing systems 10a, 10b, 10c. For example, the material testing systems 10a, 10b, 10c may include a local copy of the change detection application 50 while the cloud solution of the change detection system 40, 140, 240 may be configured to scrape data at periodic intervals from the material testing systems 10a, 10b, 10c, update and/or train models with new data, and push updated models to the locally running change detection applications 50 of the connected material testing systems 10a, 10b, 10c at periodic intervals.

Described herein with respect to FIGS. 6A-9 is an exemplary embodiment of the present invention detecting changes during a material testing sequence of a heart valve tester (HVT). In this exemplary test, a heart valve replacement device is tested by cycling fluid through the valve at an accelerated rate, up to 30 cycles per second. During the test, the pressure gradient across the valve is measured via two pressure sensors, one on the proximal side and one on the distal side of the valve. From these, a change in pressure measurement is achieved by arithmetically subtracting the distal value from the proximal value. In good conditions, this result should fall in a range similar to the physiologic range (e.g. peak pressure of ~120 mmHg).

Tests in accordance to HVT test described above can run for several month. In addition to changes in the behavior of the valve itself, a common issue that can arise during testing is that air bubbles get into the pressure sensor's body. In the sensor, these bubbles act as small springs and create a resonant effect that, over time, can induce significant problematic harmonics in the test data. However, because the change in pressure waveform itself has significant harmonic content (which can be hard to predict), the harmonic issues created by bubbles may not be detected until they reach high levels and have already caused data artifacts going back many cycles.

The example shown in FIGS. 6A-9 shows the use of an LSTM model trained on approximately 4 days of a training portion of a testing sequence for providing "good data" to the LSTM model. Following this, data showing the effects of air entering the sensor body is introduced to the model. The data set has a gradual increase in bubble size; as the bubble size increased the resonant frequency of the bubble reduces, and the magnitude of the effect increases.

FIG. 6A depicts a graphical representation of data obtained during the beginning of a training mode of a first fatigue test, in accordance with embodiments of the present invention. Specifically, the change in pressure is plotted in the ordinate or Y-axis, while the X-axis or abscissa is plotted time. As the test is a fatigue test occurring across many cycles, shown in this figure is data taken from the beginning of the training stage.

FIG. 6B depicts a graphical representation of data obtained at the end of the training mode of the first fatigue test of FIG. 6A, in accordance with embodiments of the present invention. Like the previous FIG. 6A, FIG. 6B shows the change in pressure plotted in the ordinate or Y-axis, while the X-axis or abscissa is plotted time. Both FIGS. 6A and 6B appear to include similar looking data, as the heart valve material under test is acting consistently under the test at this stage.

FIG. 6C depicts a graphical representation of data obtained at the beginning of a prediction mode of the first fatigue test of FIGS. 6A-6B, in accordance with embodiments of the present invention. Again, the change in pressure is plotted in the ordinate or Y-axis, while the X-axis or abscissa is plotted time. This plot represents the beginning of the predicting or detecting stage, after the training stage is complete. Here, the test data appears consistent with the model.

FIG. 6D depicts a graphical representation of data obtained at the end of the prediction mode of the first fatigue test of FIGS. 6C-6D, in accordance with embodiments of the present invention. Again, the change in pressure is plotted in the ordinate or Y-axis, while the X-axis or abscissa is plotted time. Here, unlike the earlier test data, the plot shows very distorted waveforms relative to the "good data" used to train the LSTM model shown in FIGS. 6A and 6B.

Figure 7:
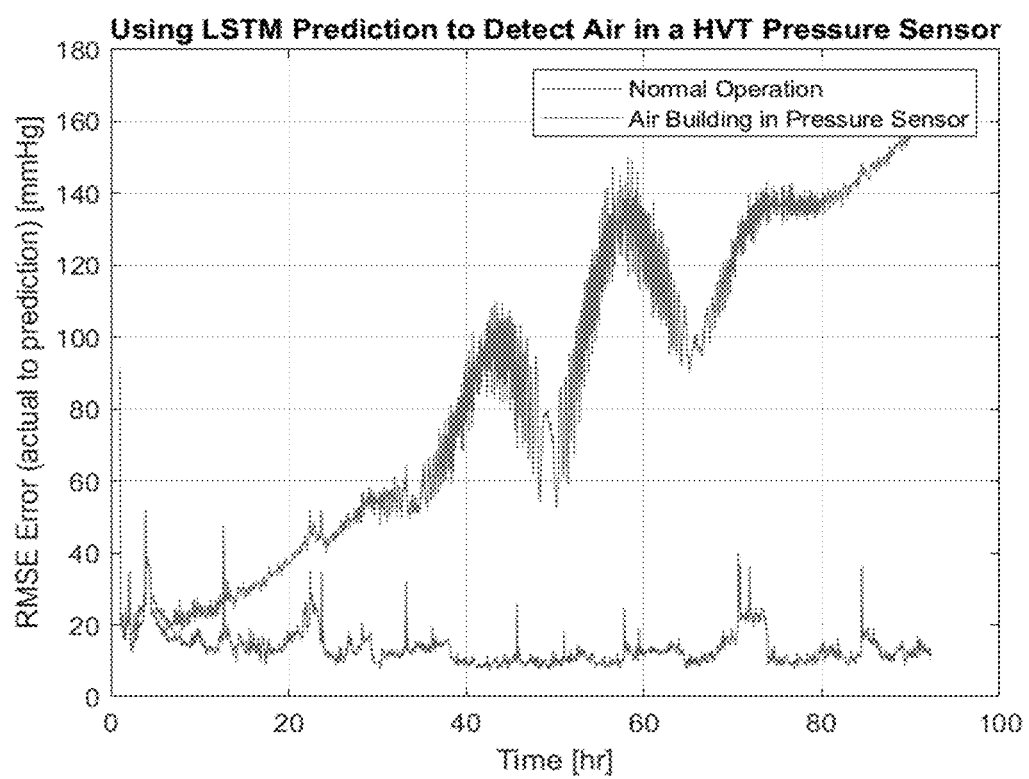
FIG. 7 depicts a graphical representation of root mean squared error (RMSE) values for the data from the first fatigue test of FIGS. 6A-6D, in accordance with embodiments of the present invention.

FIG. 7 depicts a graphical representation of root mean squared error (RMSE) values for the data from the first fatigue test of FIGS. 6A-6D, in accordance with embodiments of the present invention. In particular, the RMSE values are plotted on the ordinate, while time is plotted on the abscissa. As shown, the bottom plot over time is the exemplary test data of the model taken, for example, during points in time shown in FIGS. 6A and 6B. The plot that rises over time shows the data as the bubble begins to build in the pressure sensor. As shown, this gets worse and worse as time goes on. It is contemplated that the change detection system 40, 140, 240 may be configured to use the RMSE calculation to determine when the system begins to behave dissimilarly to the model plot. For example, the change detection system 40, 140, 240 may already know that a bubble is beginning to form after hour 6 or 7, when the plot is consistently above the model.

FIG. 8A depicts a graphical representation of data obtained during the beginning of a training mode of a second fatigue test, in accordance with embodiments of the present invention. Specifically, the change in pressure is plotted in the ordinate or Y-axis, while the X-axis or abscissa is plotted time. As the second fatigue test is a fatigue test occurring across many cycles, shown in this figure is data taken from the beginning of the training stage.

FIG. 8B depicts a graphical representation of data obtained at the end of the training mode of the first fatigue test of FIG. 8A, in accordance with embodiments of the present invention. Like the previous FIG. 8A, FIG. 8B shows the change in pressure plotted in the ordinate or Y-axis, while the X-axis or abscissa is plotted time. Both FIGS. 8A and 8B appear to include similar looking data, as the heart valve material under test is acting consistently under the test at this stage.

FIG. 8C depicts a graphical representation of data obtained at the beginning of a prediction mode of the second fatigue test of FIGS. 6A-6B, in accordance with embodiments of the present invention. Again, the change in pressure is plotted in the ordinate or Y-axis, while the X-axis or abscissa is plotted time. This plot represents the beginning of the predicting or detecting stage, after the training stage is complete. Here, the test data appears consistent with the model.

FIG. 8D depicts a graphical representation of data obtained at the end of the prediction mode of the second fatigue test of FIGS. 6C-6D, in accordance with embodiments of the present invention. Again, the change in pressure is plotted in the ordinate or Y-axis, while the X-axis or abscissa is plotted time. Here, unlike the earlier test data from FIG. 6D, the plot does not show any distortion in the waveform noticeable by the human eye relative to the "good data" used to train the LSTM model shown in FIGS. 8A and 8B.

Figure 9:
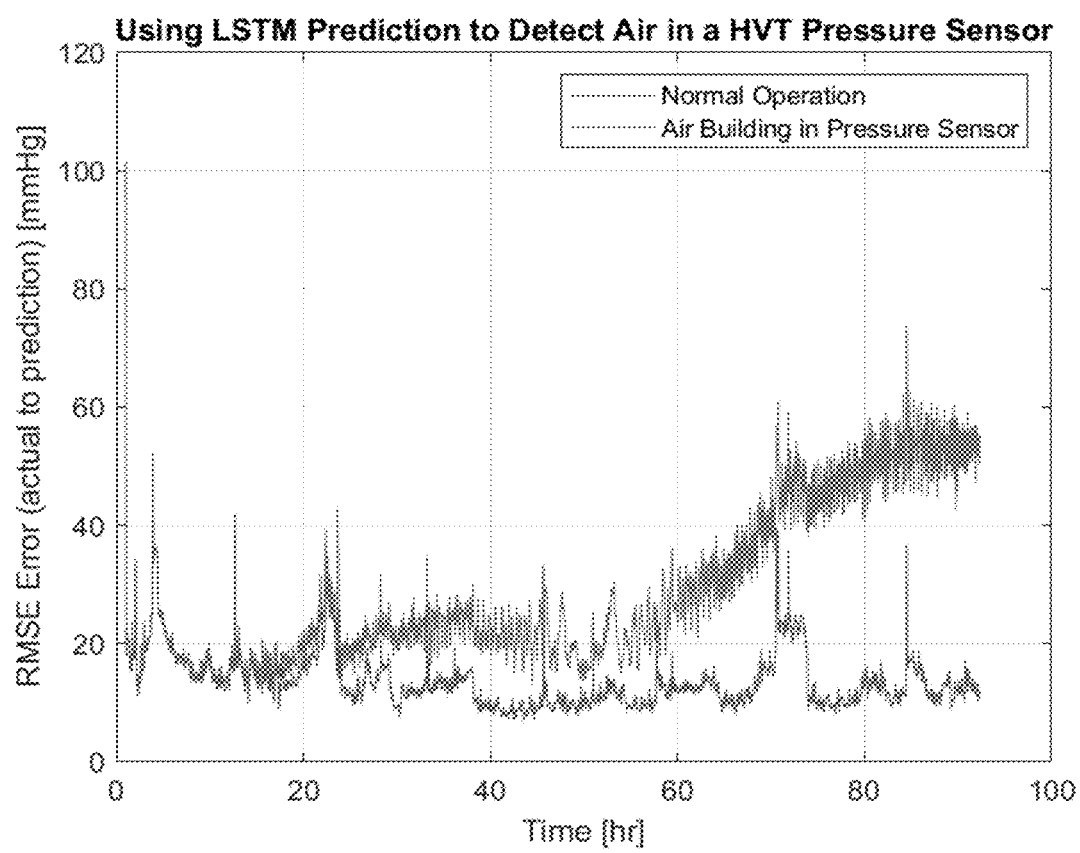
FIG. 9 depicts a graphical representation of root mean squared error (RMSE) values for the data from the fatigue test of FIGS. 8A-8D, in accordance with embodiments of the present invention.

FIG. 9 depicts a graphical representation of root mean squared error (RMSE) values for the data from the fatigue test of FIGS. 8A-8D, in accordance with embodiments of the present invention. In particular, the RMSE values are plotted on the ordinate, while time is plotted on the abscissa. As shown, the bottom plot over time is the exemplary test data of the model taken, for example, during points in time shown in FIGS. 8A and 8B. The plot that rises over time shows the data as the bubble begins to build in the pressure sensor. As shown, this gets worse and worse as time goes on, starting at about the 20 hour point. It is contemplated that the change detection system 40, 140, 240 may be configured to use the RMSE calculation to determine when the system begins to behave dissimilarly to the model plot. For example, the change detection system 40, 140, 240 may already know that a bubble is beginning to form at or around hour 20, when the plot is consistently above the model. At this point in time, the actual test data shown in FIG. 8D may not yet be discernibly different than the good data by an observer or testing operator.

Various methods are contemplated for automatically detecting changes or anomalies in material testing sequence using machine learning and/or neural network modeling. For example, methods herein include initiating a fatigue test by a material testing system, collecting test data by a computer system during a training stage of the fatigue test, training a model using machine learning based on the collected test data, continuing the fatigue test after the model is trained and continuing to receive additional test data during the fatigue test, using the model to detect an anomaly in the fatigue test. Various methods include providing notifications to operators when an anomaly or change is detected, or actually altering a test sequence in some way, such as by shutting down the test sequence early.

Figure 10:
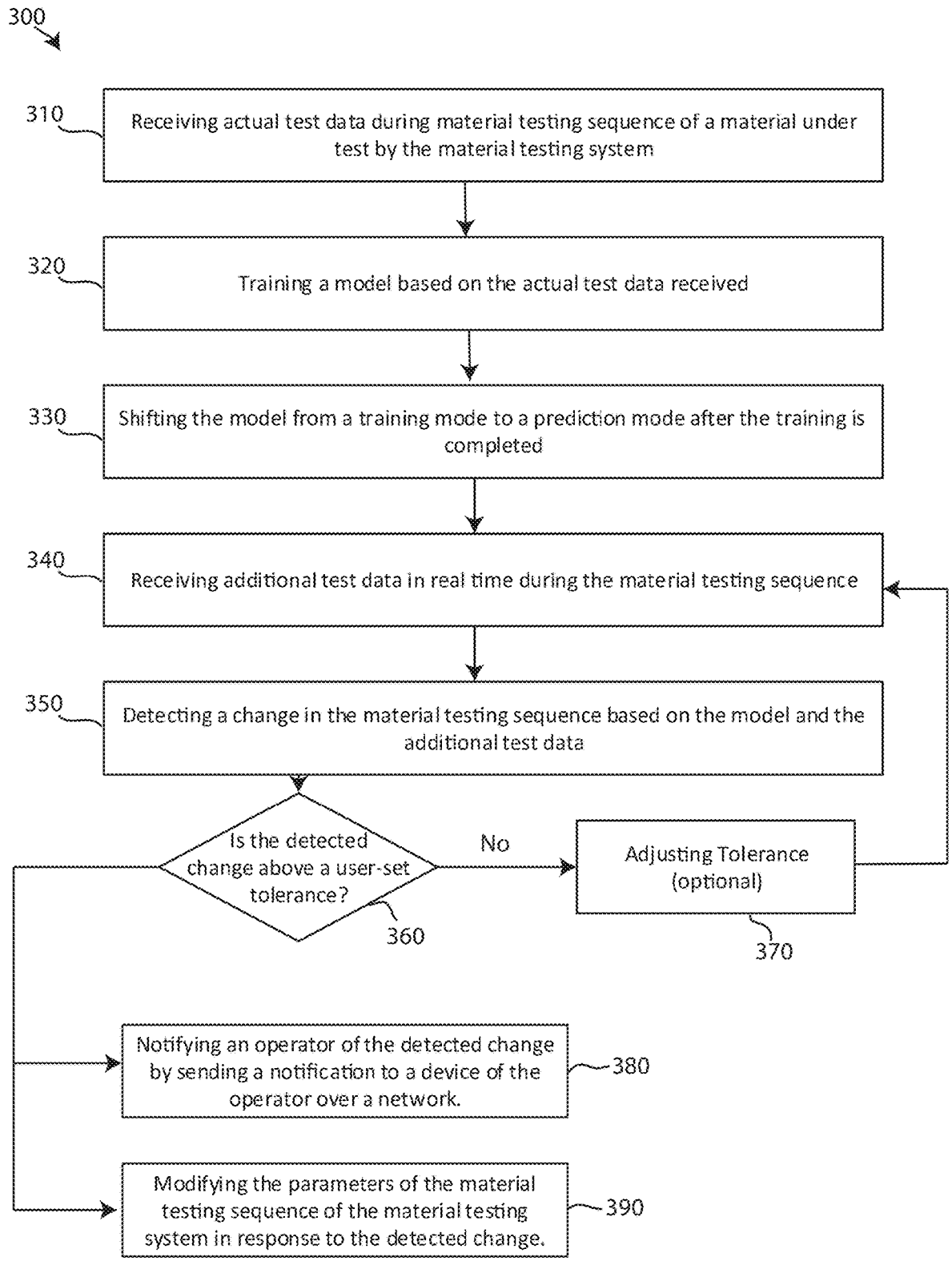
FIG. 10 depicts a method for detecting change in fatigue testing, in accordance with embodiments of the present invention.

FIG. 10 depicts a method 300 for detecting change in a material testing sequence, in accordance with embodiments of the present invention. The method 300 is an exemplary method and may be performable by the change detection systems 40, 140, 240 described hereinabove. The method 300 includes a step 310 of receiving, by one or more processors of a computer system, such as one of the change detection systems 40, 140, 240, operable connected to a material testing system, such as one of the material testing systems 10, 100, 200, actual test data during a material testing sequence of a material under test by the material testing system. The method 300 includes a next step 320 of training, by the computer system, a model based on the actual test data received. The method includes a next step 330 of shifting, by the computer system, the model from a training mode to a prediction mode after the training is completed. Next, the method 300 includes a step 340 of receiving, by the computer system after the training, additional test data in real time during the material testing sequence, and then a step 350 of detecting, by the computer system, a change in the material testing sequence based on the model and the additional test data.

The method 300 includes a step 360 of determining, by the computer system, whether the detected change is above a set tolerance. The tolerance may be, for example, user set or factory set. If the detected change is not above the tolerance, the method includes going back to the step 340 of receiving more test data in real time. The method 300 includes an optional step 370 of allowing an operator to adjust the tolerance if necessary. In some embodiments, the step 370 can be incorporated in the method as a preliminary step to the method 300 prior to the receiving of any actual data associated with a test sequence.

If the step 360 determines that the detected change is above the tolerance or threshold, the method 300 proceeds to one or both of steps 380, 390. In the step 380, the method 300 includes notifying an operator of the detected change by sending a notification to a device of the operator over a network. In other embodiments, step 380 may include notifying a user interface of a material testing system 10, 100, 200. Alternatively or additionally, the method 300 may include the step 390 of modifying the parameters of a testing sequence such as a fatigue test in response to the detected change.

Methods further contemplate collecting data from a plurality of material testing systems over a plurality of material testing sequences and using this data to generate a model using a cognitive neural network (CNN). Methods further contemplated include predicting expected results of a material testing sequence and flagging anomalies that are outside of a preset tolerance from the predicted expected results. Still further, methods contemplated herein predict using the CNN model to actually determine the likely cause of the flagged anomalies. Methods contemplated include systems configured to learn over the course of many testing sequences conducted by one or more material testing systems.

Figure 11:
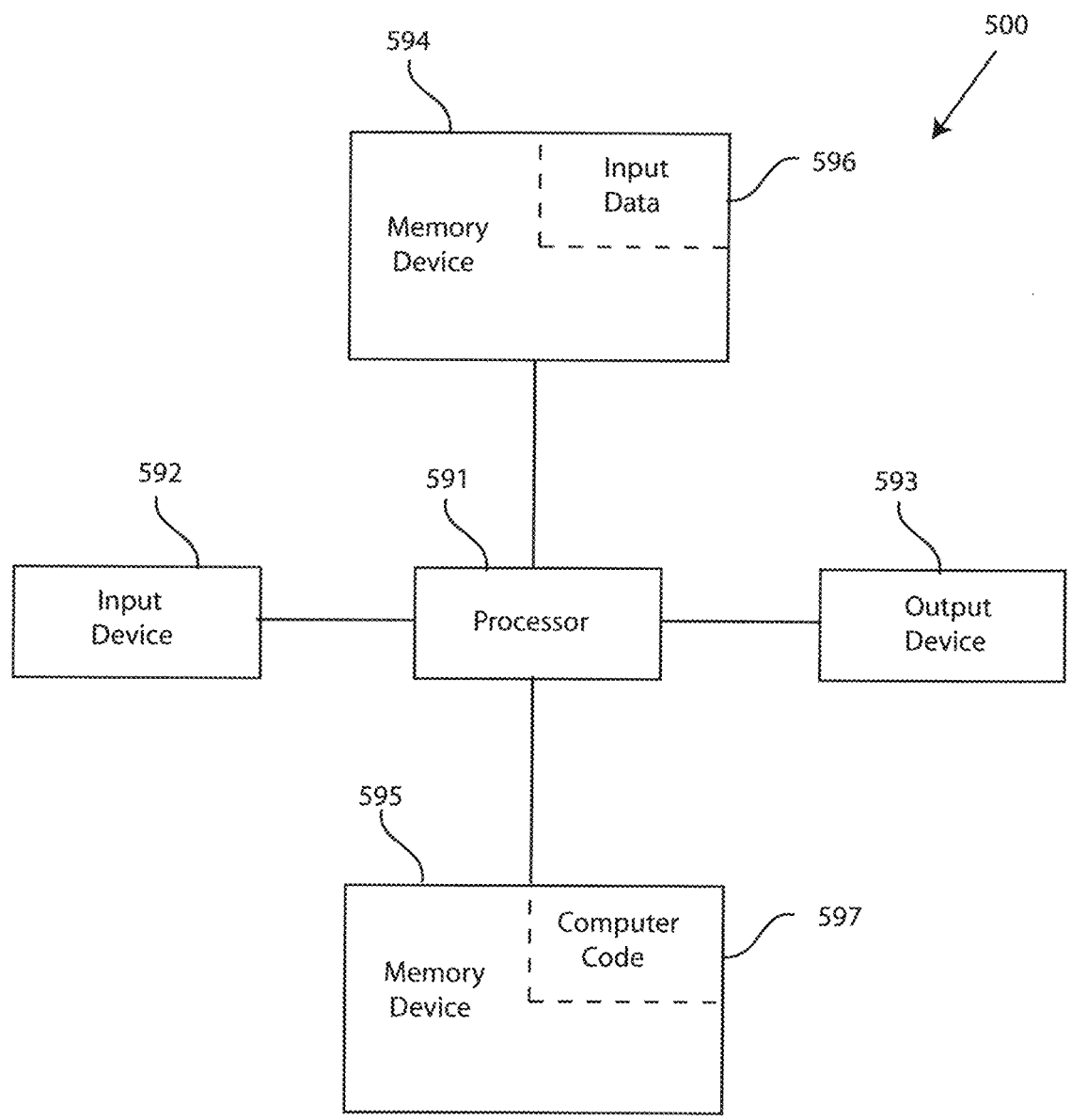
FIG. 11 depicts a block diagram of a computer system for the material testing systems and change detection system of FIGS. 1-5, capable of implementing methods for detecting a change in a material test of FIG. 10, in accordance with embodiments of the present invention.

FIG. 11 depicts a block diagram of a computer system for material testing systems and change detection systems of FIGS. 1-5, capable of implementing methods for detecting a change in a material test of FIG. 10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for detecting a change in a material test in the manner prescribed by the embodiments of FIG. 10 using the material testing systems and/or change detection systems of FIGS. 1-5, wherein the instructions of the computer code 597 may be executed by processor 591 via memory device 595. The computer code 597 may include software or program instructions that may implement one or more algorithms for implementing the method for detecting a change in a material test, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 63 as shown in FIG. 4.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to error compensation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to detect changes in a material test. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for detecting change in a material test. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for detecting change in a material test.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been shown and described with reference to specific embodiments, it should be understood by those skilled in the art that various changes in form and detail may be made therein without departing from the spirit and scope of the invention as recited in the accompanying claims.

What is claimed is:

1. A material testing system comprising:
   a fixture;
   a frame;
   a load sensor;
   a displacement sensor; and
   a computer system coupled to the material testing system, the computer system comprising:
      one or more processors;
      one or more memory devices coupled to the one or more processors;
      one or more computer readable storage devices coupled to the one or more processors, wherein the one or more storage devices contain program code executable by the one or more processors via the one or more memory devices to implement a method for detecting a change in a material testing sequence, the method comprising:
         receiving, by the computer system, actual test data during a material testing sequence of a material under test by the material testing system;
         training, by the computer system, a model based on the actual test data received;
         receiving, by the computer system after the training, additional test data in real time during the material testing sequence; and
         detecting, by the computer system, a change in the material testing sequence based on the model and the additional test data.

2. The material testing system of claim 1, wherein the model is a long short-term memory (LSTM) model.

3. The material testing system of claim 1, the method further comprising:
   notifying, by the computer system, an operator of the detected change by sending a notification to a device of the operator over a network.

4. The material testing system of claim 1, the method further comprising:
   modifying, by the computer system, the parameters of the material testing sequence of the material testing system in response to the detected change.

5. The material testing system of claim 1, the method further comprising:
   shifting, by the computer system, the model from a training mode to a prediction mode after the training is completed.

6. The material testing system of claim 1, wherein the change in the material testing sequence corresponds to a physical change in the material under test.

7. The material testing system of claim 1, wherein the training includes accounting for changes in a testing environment over time.

8. The material testing system of claim 1, the method further comprising:
adjusting, by the computer system, a tolerance of the model based on user input, the tolerance providing a threshold over which the computer system will flag the change.

9. The material testing system of claim 1, wherein the model is a cognitive neural network (CNN) model, the method further comprising:
using, by the computer system, test data from the material testing sequence of the material under test on a second material testing sequence of a second material under test conducted at a later time than the material testing sequence; and
predicting, by the computer system, a cause of failure using the CNN model.

10. A method for detecting a change in a material testing sequence, the method comprising:
receiving, by one or more processors of a computer system operable connected to a material testing system, actual test data during a material testing sequence of a material under test by the material testing system;
training, by the computer system, a model based on the actual test data received;
receiving, by the computer system after the training, additional test data in real time during the material testing sequence; and
detecting, by the computer system, a change in the material testing sequence based on the model and the additional test data.

11. The method of claim 10, wherein the model is a long short-term memory (LSTM) model.

12. The method of claim 10, further comprising:
notifying, by the computer system, an operator of the detected change by sending a notification to a device of the operator over a network.

13. The method of claim 10, further comprising:
modifying, by the computer system, the parameters of the material testing sequence of the material testing system in response to the detected change.

14. The method of claim 10, further comprising:
shifting, by the computer system, the model from a training mode to a prediction mode after the training is completed.

15. The method of claim 10, wherein the change in the material testing sequence corresponds to a physical change in the material under test.

16. The method of claim 10, wherein the training includes accounting for changes in a testing environment over time.

17. The method of claim 10, further comprising:
adjusting, by the computer system, a tolerance of the model based on user input, the tolerance providing a threshold over which the computer system will flag the change.

18. The method of claim 10, wherein the model is a cognitive neural network (CNN) model, the method further comprising:
using, by the computer system, test data from the material testing sequence of the material under test on a second material testing sequence of a second material under test conducted at a later time than the material testing sequence.

19. A computer program product, comprising a computer readable hardware storage device storing a computer readable program code, the computer readable program code comprising an algorithm that when executed by a computer processor of a computing system, implements a method for detecting a change in a material testing sequence, the method comprising:
receiving, by the one or more processors of the computer system, actual test data during a material testing sequence of a material under test by the material testing system;
training, by the computer system, a model based on the actual test data received;
receiving, by the computer system after the training, additional test data in real time during the material testing sequence; and
detecting, by the computer system, a change in the material testing sequence based on the model and the additional test data.

20. A method for detecting a change in fatigue testing, the method comprising:
initiating a fatigue test by a material testing system;
collecting test data by a computer system during a training stage of the fatigue test;
training a model using machine learning based on the collected test data;
continuing the fatigue test after the model is trained and continuing to receive additional test data during the fatigue test; and
using the model to detect an anomaly in the fatigue test.

* * * * *